United States Patent Office 2,870,194
Patented Jan. 20, 1959

2,870,194
PROCESS FOR PREPARING 2,2'-BIARYLDICARBOXYLIC ACIDS

Philip S. Bailey, Austin, Tex., assignor, by mesne assignments, to Esso Research and Engineering Company, Elizabeth, N. J., a corporation of Delaware No Drawing. Application May 14, 1956
Serial No. 584,428

9 Claims. (Cl. 260—469)

This invention is directed to a process for the preparation of 2,2'-biaryldicarboxylic acids. More particularly, the present invention is directed to a process for the preparation of 2,2'-biaryldicarboxylic acids such as diphenic acid from ozonization products of phenanthrene compounds.

In application Ser. No. 584,461 of Philip S. Bailey, filed of even date herewith, there is disclosed a process for the preparation of 3,8-alkoxy-4,5,6,7-diaryl-1,7-dioxacyclooctanes (hereinafter referred to as dialkoxy peroxides) by the ozonization of phenanthrene compounds in suspension in $C_1$ to $C_{10}$ aliphatic alcohols, such dialkoxy peroxides having the formula:

(I)

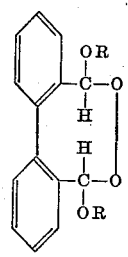

wherein R is a $C_1$ to $C_{10}$ alkyl group.

It will be understood that when the dialkoxy peroxide is derived from phenanthrene the aryl groups of Formula I, supra, will be unsubstituted, as shown. However, when the dialkoxy peroxide is derived from a substituted phenanthrene as hereinafter set forth, the aryl groups will be correspondingly substituted.

In accordance with the present invention, 2,2'-biaryldicarboxylic acids are prepared from such 3,8-dialkoxy peroxides by hydrolyzing such peroxide with a basic hydrolyzing agent and by oxidizing the hydrolysis product with an oxidizing agent, such hydrolysis and oxidation reactions being conducted either simultaneously or sequentially in solution in a non-reactive polar organic solvent. For satisfactory results it is necessary that the dialkoxy peroxide be substantially free from reaction by-products formed during the ozonization of the parent phenanthrene compound as described in the said copending application Serial No. 584,461.

While applicant does not wish to be bound by any particular theory, it is believed that the conversion of the dialkoxy peroxide to the dicarboxylic acid occurs in a stepwise manner with the formation of intermediate products. Thus, it is believed that, as a result of the hydrolysis reaction, the peroxide is first converted to an alkyl 2'-formyl-2-biaryl-carboxylate which is, in turn, converted to a 2'-formyl-2-biarylcarboxylic acid. It is further believed that it is the 2'-formyl-2-biarylcarboxylic acid which is oxidized to form the 2,2'-biarylcarboxylic acid. This may be represented schematically as follows:

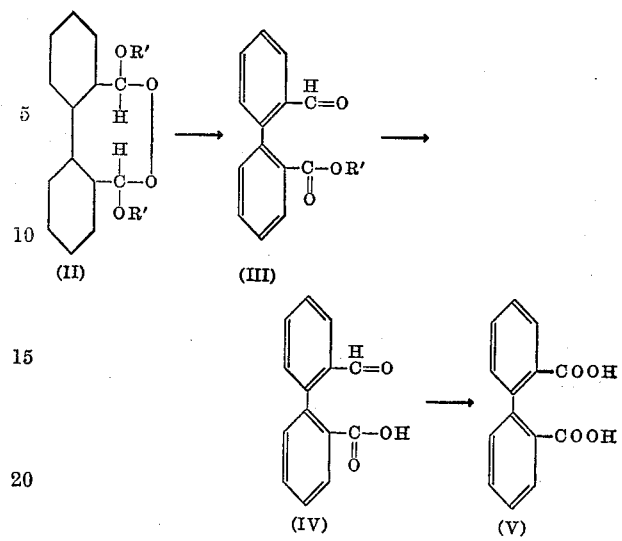

In the above formulae R represents a $C_1$ to $C_{10}$ alkyl group. The above schematic showing has been made with respect to a dialkoxy peroxide derived from phenanthrene. It will be understood that in the case of dialkoxy peroxides derived from substituted phenanthrenes the aryl groups of the above formulae will be correspondingly substituted.

Hydrolysis of the dialkoxy peroxide (Formula II) to form an alkyl 2'-formyl-2-biarylcarboxylate and hydrolysis of the carboxylate (Formula III) to form a 2'-formyl-2-biarylcarboxylic acid (Formula IV) should be conducted under non-acidic conditions if the desired products are to be obtained. Oxidation of 2'-formyl-2-biarylcarboxylic acid to form a 2,2'-biaryldicarboxylic acid (Formula V) may be conducted under alkaline, neutral, or acidic conditions.

In accordance with one embodiment of the present invention the dialkoxy peroxide starting material is brought into simultaneous contact with a suitable basic hydrolyzing agent and with an oxidizing agent. In accordance with another embodiment of the present invention the peroxide starting material is first hydrolyzed (by either a one step or two step hydrolysis) and the 2'-formyl-2-biarylcarboxylic acid hydrolysis product is then contacted with an oxidizing agent to form a 2,2'-biaryldicarboxylic acid.

The hydrolysis and oxidation reactions, whether conducted simultaneously or sequentially, are preferably conducted at a temperature of at least about 60° C. and for best results the reactions are conducted at reflux temperature.

When the peroxide starting material is derived from phenanthrene, the dicarboxylic acid is diphenic acid. Diphenic acid and similar dicarboxylic acids, obtainable by the process of the present invention are useful for a wide variety of purposes. They may be used, for example, as intermediates in the preparation of plasticizers and, in the form of their anhydrides, for the preparation of polyamides, polyesters, etc.

There is used as a starting material for the present invention the isolated 3,8-alkoxy-4,5,6,7-diaryl-1,7-dioxacyclooctane reaction product formed by the ozonization of a phenanthrene compound in a $C_1$ to $C_{10}$ aliphatic alcohol as described in the aforesaid application Serial No. 584,461. Mixtures of two or more such dialkoxy peroxides may be used, if desired.

Thus, there may be used peroxides derived from phenanthrene and substituted phenanthrenes. Representative substituted phenanthrenes from which the peroxides may be derived include retene (1-methyl-7-isopropyl-phenanthrene), 3-methylphenanthrene, 1-methylphenanthrene, 2- methylphenanthrene, 4-methylphenanthrene, 1-propylphenanthrene, 2-propylphenanthrene, 1-ethyl-2-methylphenanthrene, 1-butylphenanthrene, pinanthrene (1,7-dimethylphenanthrene), 1 - butyl - 2 - methylphenanthrene, 3 - ethyl - 5 - methylphenanthrene, 3 - ethyl - 6 - methylphenanthrene, 1,2,8 - trimethylphenanthrene, 1 - ethyl - 7 - iso - propylphenanthrene, 1,2,7 - trimethylphenanthrene, 1,2,6 - trimethylphenanthrene, 2 - isopropyl - 1,-7,8 - trimethylphenanthrene, 1 - phenylphenanthrene, 2-phenylphenanthrene, 2 - phenanthrenecarboxylic acid, 3-phenanthrenecarboxylic acid, 2 - phenanthrenesulfonic acid, 2 - nitrophenanthrene, 3 - nitrophenanthrene, 2-acetylphenanthrene, 3 - acetylphenanthrene, 1,7 - phenanthrenedicarboxylic acid.

A preferred class of phenanthrene compounds from which the peroxide starting materials for the present invention may be derived include phenanthrenes having the formula:

(VI)

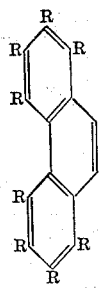

wherein R is selected from the group consisting of hydrogen and alkyl and aryl groups.

In this situation, the dialkoxy peroxide will have the formula:

(VII)

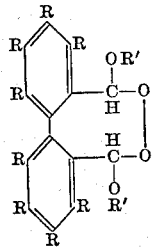

wherein R has the meaning given above with respect to Formula VI; and wherein R' is a $C_1$ to $C_{10}$ alkyl group.

The polar organic solvent to be employed may be an alcohol, ketone, ether, etc., or a mixture of two or more such solvents which are miscible with each other. Representative solvents of this nature include $C_1$ to $C_{10}$ aliphatic alcohols such as methanol, ethanol, propanol, butanol, amyl alcohol, hexyl alcohol, heptyl alcohol, octanol, nonyl alcohol; ketones such as acetone, methylethylketone, diethylketone, methylpropylketone, methylisopropylketone, cyclohexanone, etc.; ethers such as diethyl ether, isopropyl ether, dioxane, etc. $C_1$ to $C_4$ aliphatic alcohols constitute a preferred class of solvents. It is preferable to use an amount of solvent such that there is provided from about 0.1 to about 10 mols of peroxide per liter of solvent.

The selection of the particular solvent to be employed is dependent in part upon the reaction sequence to be employed. Thus, if the peroxide starting material is to be sequentially hydrolyzed and then oxidized and if, further, a two step hydrolysis reaction is to be employed wherein the first intermediate product obtained is an alkyl-2'-formyl-2-biphenylcarboxylate, any suitable polar organic solvent of the type set forth above may be used in the preparation of the carboxylate. Furthermore, in this instance, the carboxylate may be formed merely by heating the peroxide starting material in solution in the polar organic solvent to a temperature of more than about 60° C. That is to say, it is not absolutely necessary to employ a hydrolyzing agent when converting the peroxide starting material to a carboxylate.

When the peroxide starting material is to be directly hydrolyzed to a 2'-formyl-2-biarylcarboxylic acid or when the alkyl carboxylate is to be formed as an intermediate to be hydrolyzed to such acid, it is necessary to employ a hydrolyzing agent. In this situation, the polar organic solvent to be employed should be miscible with the hydrolyzing agent. The hydrolyzing agents of the present invention are, in general, miscible with alcohols, ketones, etc., such as $C_1$ to $C_{10}$ aliphatic alcohols, acetone, cyclohexanone, methylethylketone, diethylketone, methylpropylketone, methylisopropylketone, etc.

In situations wherein simultaneous hydrolysis and oxidation is accomplished or when the 2'-formylbiarylcarboxylic acid is oxidized, it is necessary to employ a solvent such as an alcohol, ketone, etc. which is not reactive with the oxidizing agent. In this situation, of course, the strength of the oxidizing agent will be significant with respect to the solvent to be employed.

As indicated, the dialkoxy peroxide starting material is contacted in solution in a polar organic solvent with a suitable hydrolyzing agent in order to form the dialdehyde.

A wide variety of basic hydrolyzing agents may be used. Thus, there may be used solutions of alkali metal hydroxides, suspensions of at least partially water soluble alkaline earth metal hydroxides, aqueous solutions of water soluble amines, ammonium hydroxide, etc. For example, there may be used aqueous solutions of sodium hydroxide, potassium hydroxide, lithium hydroxide, rubidium hydroxide, etc.; aqueous slurries of calcium hydroxide, barium hydroxide, etc. Among the amines that may be used in aqueous solution are primary, secondary and tertiary amines such as pyridine, triethylamine, diethylamine, ethylamine, piperidine, morpholine, etc. Ammonium hydroxide may also be used if desired. The amount of hydrolyzing agent to be employed should be at least the chemical equivalent of the dialkoxy peroxide. Mixtures of two or more suitable basic hydrolyzing agents may be used, if desired.

Any suitable oxidizing agent may be used for the oxidization reaction such as hydrogen peroxide, silver oxide, Tollen's reagent (silver ammonia hydroxide or silver ammonia salts), Fehling's solution, Benedict's solution and other similar cupric complex oxidizing agents; ferric chloride or nitrate or sulfate; potassium ferricyanide; sodium peroxide; barium peroxide; etc. Suitable mixtures of two or more such oxidizing agents may also be used, if desired.

In situations wherein a non-alcoholic polar organic solvent is employed, there may be used oxidizing agents such as potassium permanganate, potassium dichromate (under acidic or neutral conditions only), chromic acid, nitric acids, or Caro's acid.

Further, in situations wherein sequential hydrolysis and oxidation are employed to provide, as an intermediate, either an alkyl 2'-formyl-2-biaryl-carboxylate or a 2'-formyl-2-biarylcarboxylic acid, it is possible to utilize an ozone-containing gas under anhydrous conditions in oxidizing such intermediate in order to form the desired 2,2'-biaryldicarboxylic acid.

The invention will be further illustrated by the following specific examples which are given by way of illustration and not as limitations on the scope of this invention.

*Example I*

Add about 1 gram of 3,8-dimethoxy-4,5,6,7-dibenzo-1,2-dioxacyclooctane, about 5 ml. of a 30% aqueous solution of hydrogen peroxide and about 20 ml. of a 10% aqueous solution of sodium hydroxide to about 30 ml. of ethyl alcohol. Heat the resultant mixture to reflux temperature and reflux the same for about 30 minutes. At the end of this time acidify the solution with dilute hydrochloric acid and add about an equal volume of water thereto. Cool the resultant mixture. About an 84% yield of crystalline diphenic acid (M. P. 216–222° C.) is obtained.

When 3,8-dimethoxy-4,5-(3-methylbenzo)-6,7-(4-isopropylbenzo)-1,2-dioxacyclooctane is substituted for the 3,8-dimethoxy-4,5,6,7-dibenzo-1,2-dioxacyclooctane and Example I is otherwise repeated, there is obtained as a product 3-methyl-4'-isopropyl-2,2'-biphenyldicarboxylic acid, such acid having the formula:

(VIII)

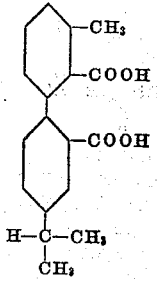

In like manner, there may be used as a starting material for Example I an equivalent amount of 3,8-dimethoxy - 4,5-benzo-6,7-(5-methylbenzo)-1,2-dioxacyclooctane, and in this situation when Example I is otherwise repeated the product that is obtained is 5-methyl-2,2'-biphenyldicarboxylic acid, such acid having the formula:

(IX)

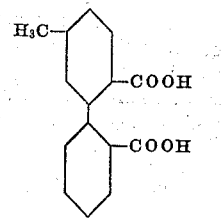

*Example II*

Add about 0.5 gram of 3,8 - dimethoxy - 4,5,6,7-dibenzo-1,2-dioxacyclooctane to about 10 ml. of methanol and reflux the same for about 2 hours. At the end of this time dilute the reaction product with about an equal volume of water and cool the resultant mixture to room temperature. There is obtained about a 93% yield of methyl-2'-formyl-2-biphenylcarboxylate having the formula:

(X)

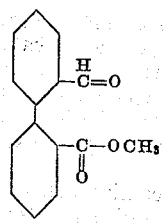

The biphenylcarboxylate gives a negative active oxygen test with potassium iodide and forms an oxime on reaction with hydroxylamine in the presence of pyridine. The analysis is as follows:

Calcd. for $C_{15}H_{12}O_3$: C, 74.99; H, 5.03. Found: C, 75.11, 75.06; H, 4.95, 4.93.

*Example III*

Add about 0.5 gram of 3,8-dimethoxy-4,5,6,7-dibenzo-1,2-dioxacyclooctane and about 6 ml. of pyridine to about 10 ml. of ethanol and reflux the resultant reaction mixture for about 30 minutes to 1 hour. Dilute the product with an equal volume of water and cool to room temperature. Substantially the same yield of methyl-2'-formyl-2-biphenylcarboxylate is obtained as in the case of Example II.

*Example IV*

Add about 2 grams of methyl 2'-formyl-2-biphenylcarboxylate and about 10 ml. of a 10% aqueous solution of sodium hydroxide to about 40 ml. of ethanol and reflux the resultant mixture for about 15 minutes. At the end of this time acidify the reaction mixture with dilute hydrochloric acid and then dilute the acidified mixture with about an equal volume of water. On cooling to room temperature there is obtained about an 80% yield of 2'-formyl-2-biphenylcarboxylic acid (M. P. 134–135° C.) having the formula:

(XI)

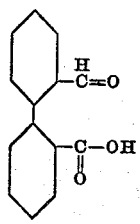

The compound gives a negative active oxygen test with potassium bromide, is soluble in dilute sodium hydroxide and sodium carbonate solutions and gives an infrared spectrum showing the presence of an aldehyde and/or carboxyl group. The analysis is as follows:

Calcd. for $C_{14}H_{10}O_3$: C, 74.33; H, 4.46. Found: C, 74.13; H, 4.45.

*Example V*

Add about 2 grams of 3,8-dimethoxy-4,5,6,7-dibenzo-1,2-dioxacyclooctane and about 10 ml. of a 10% aqueous solution of sodium hydroxide to about 40 ml. of ethanol and reflux the resultant mixture for about 15 minutes. At the end of this time acidify the reaction mixture with dilute hydrochloric acid and then dilute the acidified mixture with about an equal volume of water. On cooling to room temperature there is obtained about an 84% yield of 2'-formyl-2-biphenylcarboxylic acid (M. P. 134–135° C.).

*Example VI*

Add about 1 gram of 2'-formyl-2-biphenylcarboxylic acid, about 5 ml. of a 30% aqueous solution of hydrogen peroxide and about 20 ml. of a 10% aqueous solution of sodium hydroxide to about 30 ml. of ethanol and reflux the resultant mixture for about 30 minutes. At the end of this time acidify with dilute hydrochloric acid, dilute with about an equal volume of water and cool to room temperature. There is obtained, as a precipitate, about a 90% yield of diphenic acid (M. P. 223–228° C.).

*Example VII*

Dissolve about 1.1 grams of 2'-formyl-2-biphenylcarboxylic acid in about 15 ml. of methanol and cool the resultant solution to about 0° C. Pass a mixture of ozone and oxygen containing 4 weight percent of ozone through the cooled solution until the absorption of ozone ceases. Slightly in excess of about 1 mol of ozone per mol of 2'-formyl-2-biphenylcarboxylic acid is absorbed. Partially evaporate the methanol and then add water to form a precipitate. The product is diphenic acid (M. P. 216–222° C.).

What is claimed is:

1. A process which comprises the steps of heating to a temperature of at least about 60° C. in solution in a $C_1$ to $C_4$ aliphatic alcohol under non-acidic conditions a compound having the formula:

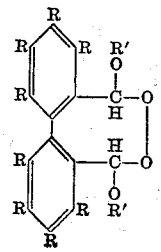

and recovering from the resultant reaction mixture a first intermediate having the formula:

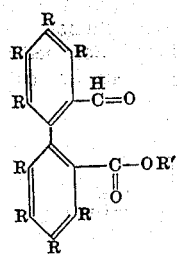

hydrolyzing said first intermediate with a hydrolyzing agent under non-acidic conditions in solution in a non-reactive polar organic solvent, to form a second reaction mixture, recovering from said second reaction mixture a second intermediate having the formula:

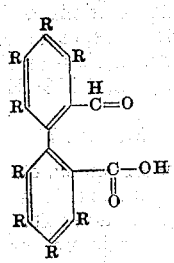

and oxidizing said second intermediate with an oxidizing agent in solution in a non-reactive polar organic solvent, whereby there is obtained a product having the formula:

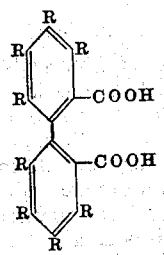

R in the above formulae being selected from the group consisting of hydrogen and alkyl and aryl groups; and R' in the above formulae being a $C_1$ to $C_{10}$ alkyl group.

2. A process conducted at a temperature of at least about 60° C. which comprises the steps of heating 3,8-dimethoxy-4,5,6,7-dibenzo-1,2-dioxacyclooctane in solution in a $C_1$ to $C_4$ aliphatic alcohol and recovering methyl 2'-formyl-2-biphenylcarboxylate from the resultant reaction product, hydrolyzing the methyl 2'-formyl-2-biphenylcarboxylate in solution in a $C_1$ to $C_4$ aliphatic alcohol, recovering 2'-formyl-2-biphenylcarboxylic acid from the reaction product and oxidizing said 2'-formyl-2-biphenylcarboxylic acid in solution in a $C_1$ to $C_4$ aliphatic alcohol whereby diphenic acid is obtained.

3. A process for preparing a compound having the formula:

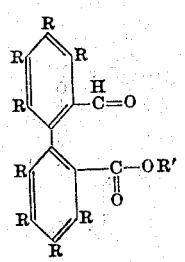

which comprises the step of heating at a temperature of at least about 60° C. in solution in a $C_1$ to $C_4$ aliphatic alcohol a compound having the formula:

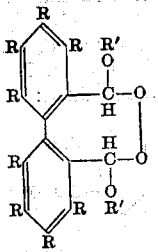

R in the above formulae being selected from the group consisting of hydrogen and alkyl and aryl groups; and R' in the above formulae being a $C_1$ to $C_{10}$ alkyl radical.

4. A process for preparing a 2,2'-biaryldicarboxylic acid which comprises the steps of dissolving a feed material consisting essentially of a 3,8-alkoxy-4,5,6,7-diaryl-1,7-dioxacyclooctane in a non-reactive polar organic solvent and hydrolyzing said dioxacyclooctane in said solution under non-acidic conditions to convert said dioxacyclooctane to the corresponding alkyl 2'-formylbiarylcarboxylate and oxidizing said 2'-formyl-biarylcarboxylate in said solution, said hydrolysis and oxidation reactions being conducted at a temperature intermediate about 60° C. and reflux temperature, acidifying the reaction mixture and then recovering said dicarboxylic acid, said solvent being selected from the class consisting of aliphatic alcohols, ketones and ethers.

5. A method as in claim 4 wherein the dioxacyclooctane is a compound having the formula:

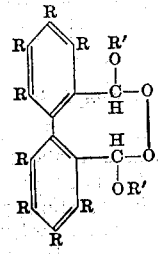

wherein R is selected from the class consisting of hydrogen, $C_1$ to $C_4$ alkyl, and phenyl; and wherein R' is a $C_1$ to $C_{10}$ alkyl group.

6. A method as in claim 5 wherein said dioxacyclooctane is simultaneously reacted with a hydrolyzing agent and an oxidizing agent under basic conditions.

7. A method as in claim 4 wherein the dioxacyclooctane is 3,8-dimethoxy-4,5,6,7-dibenzo-1,2-dioxacyclooctane and wherein the solvent is a $C_1$ to $C_4$ aliphatic alcohol.

8. A process for preparing methyl 2'-formyl-2-biphenylcarboxylate which comprises the step of refluxing a methanol solution of 3,8-dimethoxy-4,5,6,7-dibenzo-1,2-dioxacyclooctane under non-acidic conditions.

9. A process for preparing 2'-formyl-2-biphenylcarboxylic acid which comprises refluxing a solution of 3,8-dimethoxy-4,5,6,7-dibenzo-1,2-dioxacyclooctane in methanol in the presence of a basic hydrolyzing agent.

References Cited in the file of this patent

UNITED STATES PATENTS

| | | |
|---|---|---|
| 1,423,980 | Williams | July 25, 1922 |
| 2,127,096 | Vollmann et al. | Aug. 16, 1938 |
| 2,634,248 | Dazzi | Apr. 7, 1953 |
| 2,740,811 | Lotz | Apr. 3, 1956 |
| 2,786,076 | O'Connor et al. | Mar. 19, 1957 |

OTHER REFERENCES

O'Connor et al.: Ind. and Eng. Chem., vol. 49, No. 10, pp. 1701–1702, October 1957.